United States Patent
Chen et al.

(10) Patent No.: US 12,131,497 B2
(45) Date of Patent: Oct. 29, 2024

(54) FAST OBJECT SEARCH BASED ON THE COCKTAIL PARTY EFFECT

(71) Applicant: CARNEGIE MELLON UNIVERSITY, Pittsburgh, PA (US)

(72) Inventors: Fangyi Chen, Pittsburgh, PA (US); Shayeree Sarkar, Pittsburgh, PA (US); Marios Savvides, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 18/266,737

(22) PCT Filed: Jan. 31, 2022

(86) PCT No.: PCT/US2022/014558
§ 371 (c)(1),
(2) Date: Jun. 12, 2023

(87) PCT Pub. No.: WO2022/173607
PCT Pub. Date: Aug. 18, 2022

(65) Prior Publication Data
US 2024/0046503 A1 Feb. 8, 2024

Related U.S. Application Data

(60) Provisional application No. 63/147,449, filed on Feb. 9, 2021.

(51) Int. Cl.
*G06V 10/774* (2022.01)
*G06T 7/70* (2017.01)

(52) U.S. Cl.
CPC ............. *G06T 7/70* (2017.01); *G06V 10/774* (2022.01); *G06V 2201/07* (2022.01)

(58) Field of Classification Search
CPC ...... G06V 10/70; G06V 10/72; G06V 10/774; G06V 10/80; G06V 10/803; G06T 7/97;
(Continued)

(56) References Cited

U.S. PATENT DOCUMENTS

| 2004/0028271 A1 | 2/2004 | Pollard et al. |
| 2020/0162715 A1 | 5/2020 | Chaudhuri et al. |

(Continued)

OTHER PUBLICATIONS

International Search Report and Written Opinion for the International Application No. PCT/US22/14558, mailed May 12, 2022, 12 pages.
(Continued)

*Primary Examiner* — Andrew W Johns
(74) *Attorney, Agent, or Firm* — KDW FIRM PLLC

(57) ABSTRACT

Disclosed herein is an improved method for identifying images containing objects-of-interest from a large set of images. The method comprises mixing two or more of the images to create a grouped image and exposing the grouped image to an object detector trained on grouped images to make an initial determination that the grouped image was formed from at least one image containing an object-of-interest. The images which formed the grouped image are then exposed to regular object detectors to determine a classification of the object-of-interest.

10 Claims, 3 Drawing Sheets

(58) Field of Classification Search
CPC . G06T 2207/20213; G06T 2207/20221; G06F 18/25; G06F 18/251
See application file for complete search history.

(56) References Cited

U.S. PATENT DOCUMENTS

2020/0167930 A1    5/2020  Wang et al.
2020/0293714 A1    9/2020  Olshanetsky et al.
2024/0087296 A1*   3/2024  Watanabe .............. G06V 10/25

OTHER PUBLICATIONS

International Preliminary Report on Patentability for the International Application No. PCT/US22/14558, mailed Aug. 11, 2023, 18 pages.

* cited by examiner

FAST OBJECT SEARCH BASED ON THE COCKTAIL PARTY EFFECT

RELATED APPLICATIONS

This application claims the benefit of U.S. Provisional Patent Application No. 63/147,449, filed Feb. 9, 2021, the contents of which are incorporated herein in its entirety.

BACKGROUND

A common task in object detection is to search for objects-of-interest in large image datasets or frames of a video stream, where the objects-of-interest are sparse in that they only appear in a small proportion of the total images. Thus, a large number of images must be analyzed to find relatively few images containing the objects-of-interest. This is both time-consuming and wasteful of resources.

Therefore, it would be desirable to be able to provide a method of searching for sparse objects-of-interest in a large dataset in a quicker and more resource efficient manner.

SUMMARY

The cocktail party effect, sometimes referred to as "selective hearing", refers to the ability of the human brain to focus auditory attention on a particular stimulus, while filtering out a range of other stimuli, such as when a person at a cocktail party focuses on a single conversation in a noisy room. The cocktail party effect allows for the ability to segregate multiple audio stimuli into different streams and to then decide which stream or streams are most pertinent.

Disclosed herein is a novel approach to utilize the cocktail party effect with convolutional neural networks (CNNs) for fast search. The cocktail party effect in the context of a CNN means the ability to recognize semantic information from a mixture of images. Specifically, CNN models are trained using grouped images which comprise a channel-wise concatenation of multiple images. The model learns to weighted-sum each grouped image and to extract features from the grouped image. The features are used to either denoise the objects from an object-background mixture or to recognize the objects from an object-object mixture. In the testing phase, because the number of input images is reduced by combining multiple images into grouped images, the searching speed is significantly accelerated compared to regular detection methods.

The disclosed methodology can be applied to video processing, detection over video frames, and classification.

BRIEF DESCRIPTION OF THE DRAWINGS

By way of example, a specific exemplary embodiment of the disclosed system and method will now be described, with reference to the accompanying drawings, in which.

DETAILED DESCRIPTION

Figure 1:
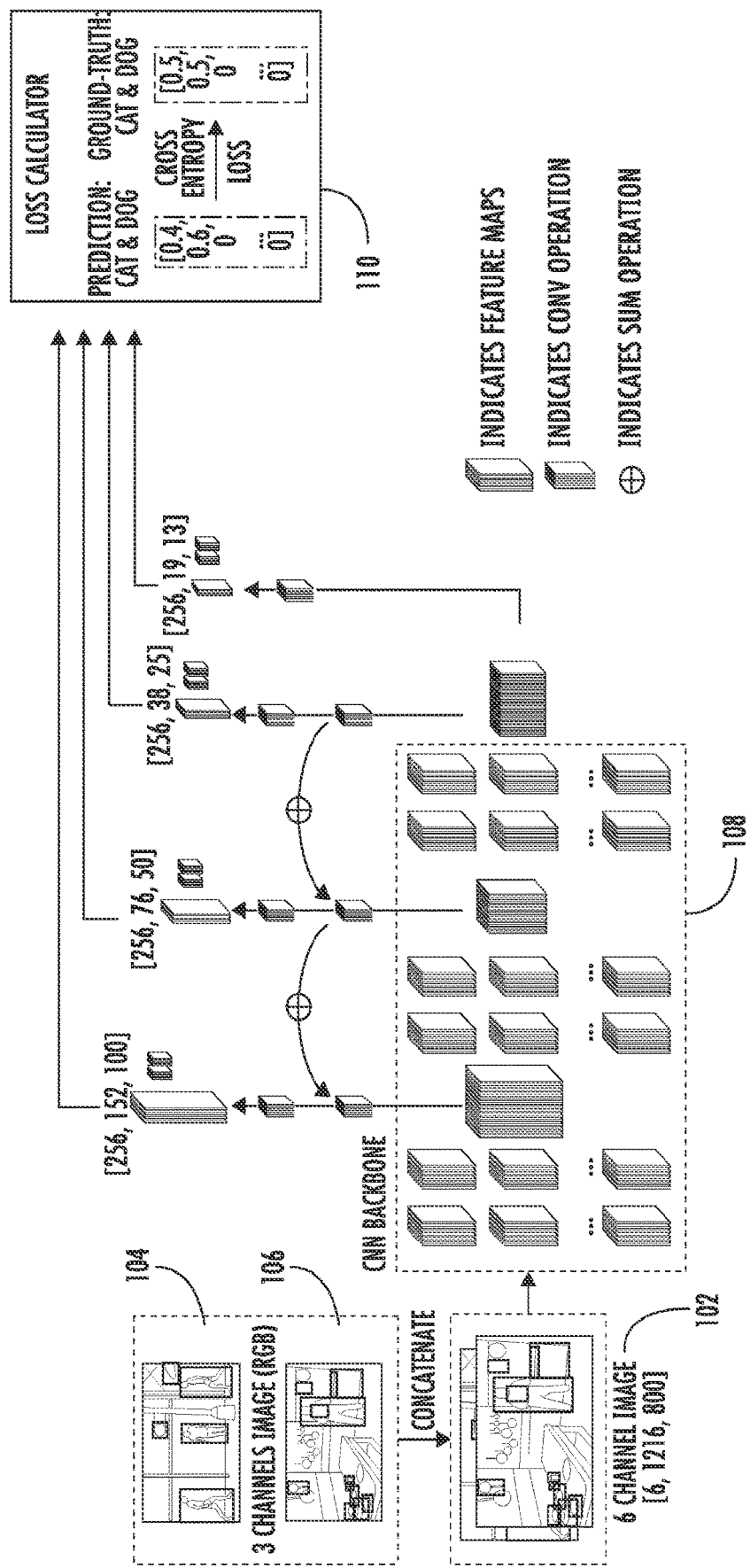
FIG. 1 is a block diagram showing the CNN for operation on grouped images.

FIG. 1 is a block diagram of an exemplary single shot detection (SSD) model used as a baseline for detection for one possible embodiment of the disclosed method. This model uses VGG-16 backbone 108. In preferred embodiments, the model may be trained with the grouped images on Pascal VOC pretrained weights for SSD for 25 epochs on multiple NVIDIA GeForce RTX 2080 GPUs. The model takes as input multiple images 104, 106 which are concatenated into a grouped image 102. The disclosed method, in preferred embodiments, works with a regular SSD as base detector. However, in alternate embodiments, any detector may be used and further customized. The classification precision and recall is on par with a baseline SSD model trained without the grouped images.

Figure 2:
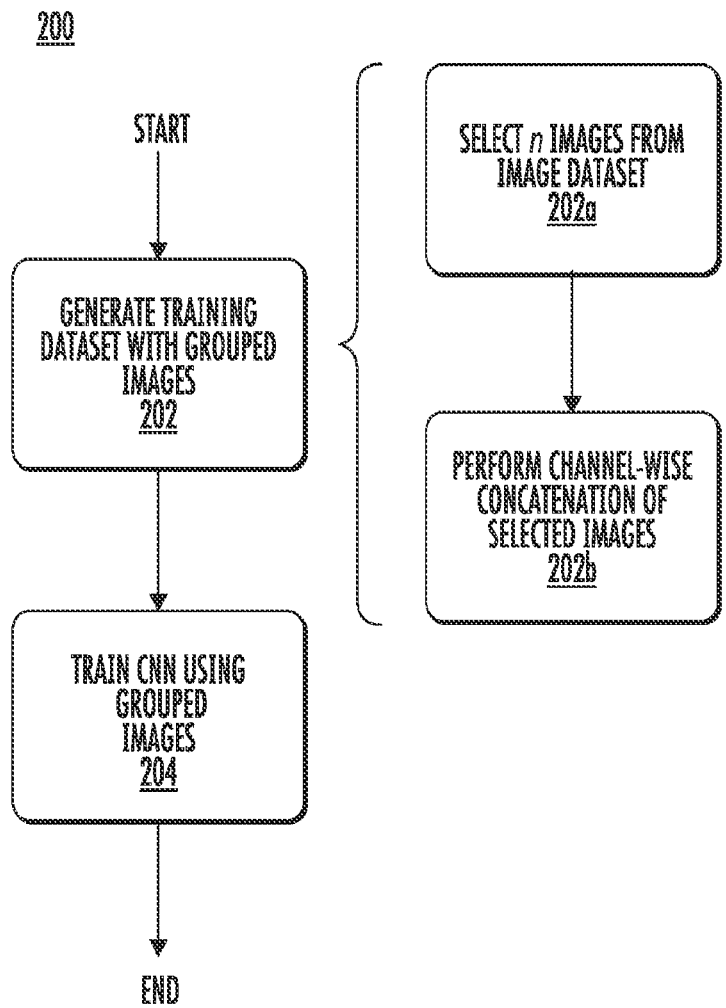
FIG. 2 is a flow chart showing the training phase.

A flowchart of the training process 200 is shown in FIG. 2. During training, at 202, a training dataset comprising grouped images 102 is generated from a large dataset of images. In some embodiments, the training dataset may be derived from known image datasets, such as COCO or VOC. Each grouped image in the training dataset comprises a group consisting of n images taken from the known image dataset. The images comprising a grouped image may, in some embodiments, be randomly selected from the image database. To create each grouped image, the n selected images, for example, images 104, 106 from FIG. 1, from the known image dataset are selected at step 202a and concatenated channel-wise at step 202b to generate the grouped images.

As an example, if n=2, each grouped image in the training dataset will comprise 2 images from the known image dataset concatenated together. In one embodiment, the concatenation occurs using a pixel-wise addition. That is, each channel of the pixel value (e.g., R, G, B channels) of a first image is added to the corresponding channel of the second image to create the grouped image. In other embodiments, any method of concatenation may be used. Thus, if the known image dataset contains N images, the training dataset will comprise N/n grouped images.

In a second step 204 of the training process 200, the CNN 108 is trained using the training dataset of grouped images. CNN 108 may be trained on any number of classes of objects-of-interest. The classification target of each pixel on the feature map of CNN 108 depends on the corresponding ground-truth of the grouped image. For example, if the pixel represents an object-of-interest, then the classification target should be the class of the object-of-interest. If the pixel represents the background-background, then the classification target should be background. If the pixel represents both a first object-of-interest and a second object-of-interest, then the target should be half of the classification target of the first object-of-interest and half of the classification target of the second object-of-interest. Preferably, only cross-entropy loss 110 is involved during the training.

Figure 3:
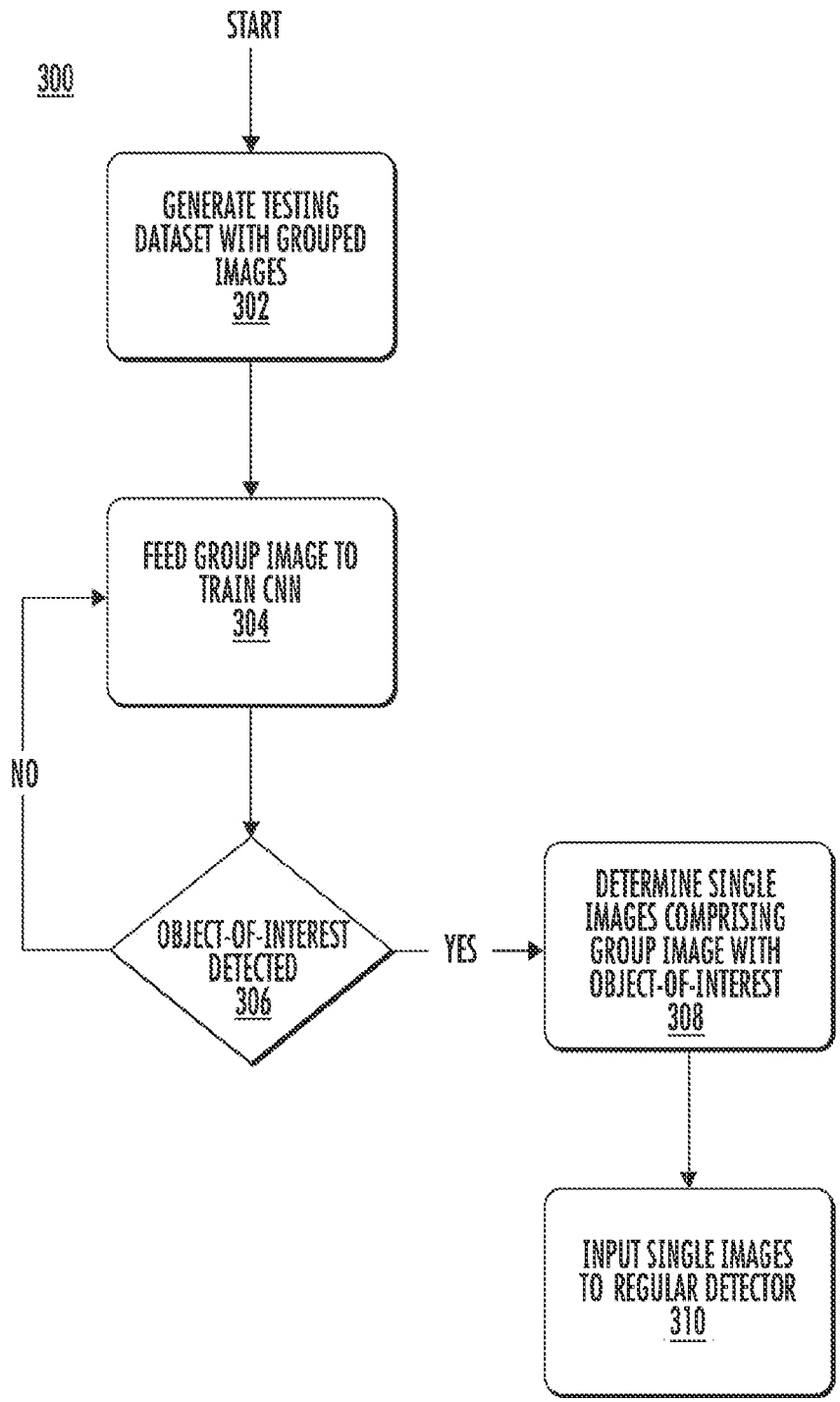
FIG. 3 is a flow chart showing the testing phase.

A flowchart showing the testing phase 300 is shown in FIG. 3. During testing, the testing pipeline is split into two phases. As with the training dataset, the input images are grouped into N/n grouped images, each grouped image comprising n images, to create the testing dataset at 302. Preferably, the grouped images in the testing dataset will have the same number of images in the grouped image as the grouped images in the training dataset. The testing dataset may be, for example, frames of a video in which the object-of-interest appears in only a few frames and is missing in the other frames.

In the first phase at step 304, a grouped image from the testing dataset is input to the detection model 108 trained on the training dataset of grouped images. When the model 108 detects a positive at 306, that is, the grouped image input to the detection model 108 is a grouped image containing an object-of-interest, the n images comprising the grouped image are determined at 308 (each grouped image contains n separate images). In the second phase, at 310, the images from which the grouped image was created are input to a regular object detector, which had been trained on the known image dataset of images to identify to which image the positive result can be attributed and to classify the object-of-interest.

Because of the reduced number of input images, the first phase is n times faster than a regular detection pipeline, and the time required for the second phase is negligible, as only a small number of grouped images will have positive results. As such, the overall testing speed is almost n times faster than a regular detection pipeline. The grouped images in the training dataset may comprise a concatenation of any number of images, however, as may be realized, accuracy will decrease as the number of concatenated images in each grouped image increases. As such, there is a trade-off between speed and accuracy in this method.

As would be realized by one of skill in the art, the disclosed method described herein can be implemented by a system comprising a processor and memory, storing software that, when executed by the processor, performs the functions comprising the method.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A method comprising:
grouping a plurality of images into multiple grouped images;
inputting each grouped image to an object detection model trained on grouped images;
determining that a grouped image contains an object-of-interest for which the object detection model has been trained;
determining the images comprising the grouped image; and
inputting each of the images to an object detector trained to detect the objects-of-interest in images;
wherein grouping a plurality of images into multiple grouped images comprises:
selecting n images; and
performing a channel-wise concatenation of the n images.

2. The method of claim 1 wherein the n images are concatenated by performing a pixel-wise addition of the n images.

3. The method of claim 2 wherein each of the n images comprises R, G, B channels and further wherein the concatenation comprises a pixel-wise addition of a value of each channel in each of the n images.

4. The method of claim 1 wherein the images are randomly selected.

5. The method of claim 4 wherein the images are randomly selected from a training dataset of images containing objects in one or more classes-of-interest.

6. The method of claim 1 wherein the object detection model trained on grouped images comprises an object model trained on a training dataset comprising a plurality of grouped images, each grouped image comprising a concatenation of n images.

7. The method of claim 6 wherein only cross-entropy loss is involved during the training.

8. The method of claim 1 wherein object detection model trained on grouped images has a single shot detector as a base detector.

9. A system comprising:
a processor; and
memory, storing software that, when executed by the processor, performs the method of claim 1.

10. A method comprising:
selecting images from a training dataset;
creating a plurality of grouped images by performing a channel-wise concatenation of a predetermined number of images from the selected images; and
training an object detector using the plurality of grouped images.

* * * * *